United States Patent Office 2,717,810
Patented Sept. 13, 1955

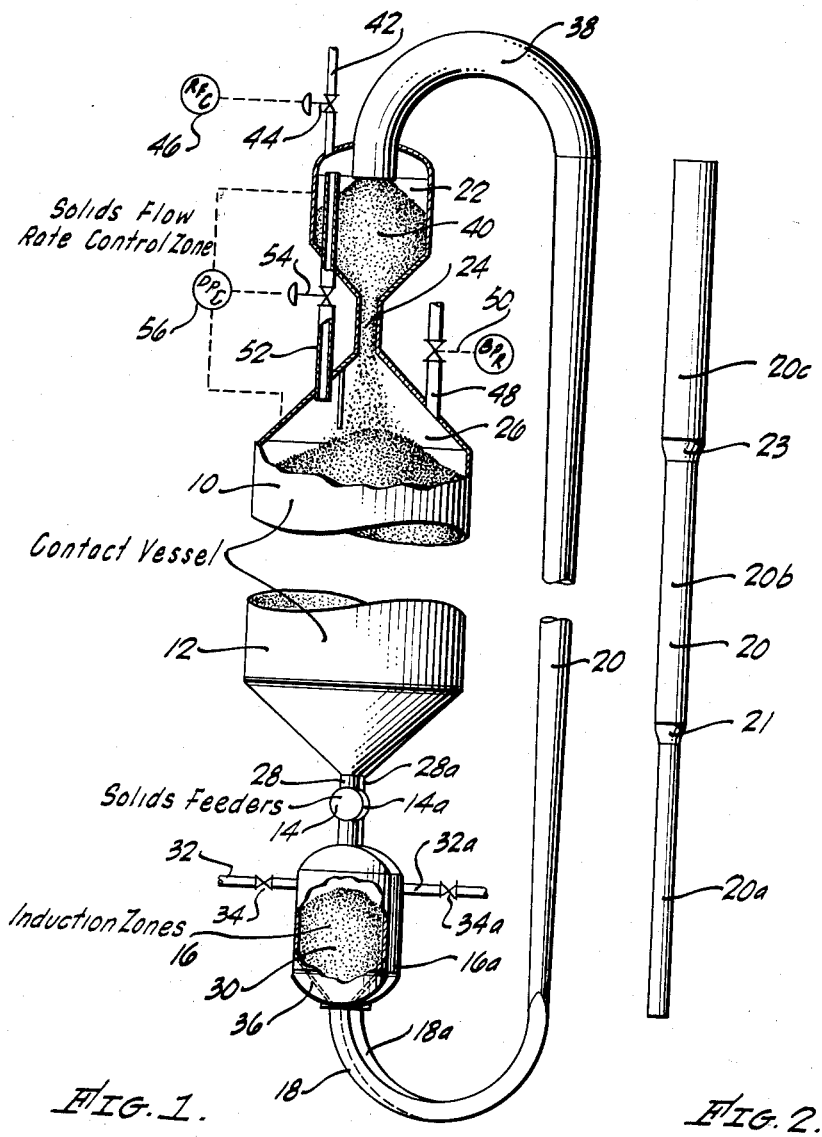

2,717,810
SOLIDS CONVEYANCE PROCESS AND APPARATUS

John E. Hines, Jr., Long Beach, Calif., assignor to Union Oil Company of California, Los Angeles, Calif., a corporation of California Application May 26, 1950, Serial No. 164,364

34 Claims. (Cl. 302—53)

This invention relates to the conveyance of granular solids and in particular relates to a process and apparatus for control of the flow rate of granular solids moving in substantially compact form under the influence of a cocurrently depressuring conveyance fluid through an elongated conveyance zone or conduit.

The movement of granular solids in appreciably large quantities presents a technical problem in many industrial operations such as the movement of cracking catalysts in the well known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized to prevent an economic disadvantage. Such conditions are pronounced in the transportation of expensive granular catalysts which are required to be circulated at rates of as high as 800 to 1,000 tons per hour as, for example, in catalytic cracking processes employing catalyst-to-oil ratios as high as about 10 to 15 or higher.

Conventionally granular solids are conveyed by moving mechanical equipment such as bucket elevators, the various forms of belt conveyors and other apparatus such as open or enclosed drag lines. For atmospheric pressure operations such mechanical equipment adequately serves to transport the granular solids at moderate rates. However, when the solids are desirably transported at high flow rates, or in connection with processes in which fluids under pressure contact the granular solids, or in processes where the attrition loss of granular solids must be kept at a minimum, numerous disadvantages of such mechanical conveyances present themselves. Among these problems is the size of the equipment necessary to transport large quantities of granular solids. For example, bucket elevators necessary to transport cracking catalysts at a rate of about 150 tons per hour are approximately 3 feet in length, 1 foot in width, and 1 foot deep. Furthermore, the maintenance of the necessary driving mechanism at temperatures of the order of those in the cracking processes is difficult and expensive and the quantity of granular solids lost by attrition in loading and unloading the buckets is frequently excessive.

An object of the present invention is to provide an improved method for the conveyance of granular solids wherein the granular solids flow in substantially compact form under the influence of a cocurrently depressuring conveyance fluid.

An additional object of this invention is to provide an improved method for controlling the flow rate of granular solids in such a conveyance method.

A more particular object of the present invention is to provide a conveyance process wherein the granular solids discharging from the conveyance conduit are passed through a restriction through which simultaneously a controllable flow of fluid is maintained thereby controlling the solids flow rate.

A further object of the present invention is to provide in processes involving the conveyance of granular solids the improved conveyance method of the present invention.

An additional specific object of this invention is to provide an improved solids-fluid contacting process wherein the granular solids conveyance method of the present invention is employed.

It is also an object of the present invention to provide an apparatus for effecting the above-mentioned objects.

Other objects and advantages of the present invention will become apparent to those skilled in the art as the description thereof proceeds.

Briefly, the present invention comprises a method for the conveyance of granular solids in substantially compact form from a source of supply, through an elongated conveyance conduit or zone cocurrent with a depressuring conveyance fluid, passing the granular solids discharging from the conveyance conduit into a restriction zone, and the step of controlling the rate of cocurrent flow of a fluid through the restriction zone thereby varying the rate of solids flow and maintaining the granular solids flowing through the conveyance zone in substantially compact form.

The term "substantially compact granular solids" refers to granular solids having a bulk density substantially the same as the bulk density as the same granular solids when at rest, unaerated, and in the absence of a moving gas stream.

In the present invention the granular solids present in the conveyance conduit are maintained in substantially compact form, the granular solids moving as a continuous solids mass through the line with the only gas space present being that existing in the voids of the compacted granules. A conveyance fluid, which may be either liquid or gaseous, is depressured cocurrently through the interstices of the granular solids thereby creating a pressure drop distributed along the length of the conveyance conduit. For a given quantity of conveyance fluid the pressure drop per unit length of conveyance zone is directly proportional to the permeability (as defined by Darcy's law of fluid flow through permeable solids) of the compact mass. This means that a lower pressure drop per unit length is manifest with flow through larger particle sizes than through a mass consisting of smaller particles. Analogously a greater quantity of conveyance fluid is required to establish a certain minimum required pressure drop per unit length for conveyance of relatively large grained particles than is required with relatively small grained particles.

The pressure drop of the conveyance fluid passing as described through the granular solids in the conveyance zone creates a conveying force in the direction of flow of the conveyance fluid. In other than horizontal conveyance conduits this conveying force is counteracted by forces of gravity and when the solids are in motion it is further counteracted by forces of friction of the granular solids mass against the inner walls of the conveyance conduit. From such considerations it is determined that a certain minimum pressure drop per unit length is required to effect the movement of granular solids in this form and it is conveniently expressed as a ratio of the conveying force to the opposing force of gravity, and is termed the "conveyance force ratio." The conveyance force ratio is expressed as $$\frac{\left(\dfrac{dp}{dl}\right)}{\rho_s \cos\theta}$$

the characters in the equation being used with consistent units such as $$\left(\frac{dp}{dl}\right)$$

is the pressure drop of conveyance fluid per unit length of the conveyance zone in pounds per square foot per foot, $\rho_s$ is the bulk density of the granular solids in pounds per cubic foot, and $\theta$ is the angular deviation of the axis of the conveyance zone from the vertical. A sufficiently high conveyance fluid flow rate is maintained to generate within the conveyance zone a conveyance force ratio at least equal to 1.0. Minimum conveyance force ratios in the line during actual operation exceed this value somewhat since solids friction against the walls is not considered in the above relationship. In usual operation a minimum conveyance force of between 1.0 and about 1.5 is sufficient to insure proper operation. However, maximum values of conveyance force ratio existing within the conveyance conduit may exceed this value. As an example of the quantity of gas necessary to generate a sufficient conveyance force ratio to effect movement of the solids it has been found that in the conveyance of T. C. C. synthetic bead catalyst about 0.083 standard cubic foot of air per pound of catalyst is sufficient and that in the conveyance of granular charcoal having a mesh size of 12 to 30 about 0.0125 standard cubic foot of air is sufficient to convey a pound of charcoal.

At the discharge opening of the conveyance zone, means are provided for maintaining the granular solids in substantially compact form. This may be accomplished by spacing a thrust plate a distance of less than about one conveyance zone diameter from the discharge opening and placing it in a plane perpendicular to the axis of the conveyance zone. This plate exerts a thrust force counter to the conveyance forces generated in the conveyance conduit. In the method of the present invention the maintenance of the granular solids in the conveyance conduit as a substantially compact mass of granules is attained as well as providing a means for varying the rate of flow of granular solids through the use of a restriction zone. In the present invention the granular solids discharge from the conveyance conduit or zone into a separator zone which communicates with and discharges solids through a restriction zone, the latter in one modification consisting of a short section of conduit preferably having a cross sectional area somewhat less than that of the discharge opening of the conveyance zone. The use of other restrictive means as orifices, and the like may be used also. The granular solids discharging from the conveyance zone form an accumulation in the separator zone and solids from the accumulation flow through the restriction zone. The restriction zone as well as the accumulation of granular solids operate together to restrict the flow of granular solids from the conveyance zone. Means are provided for controlling the rate of cocurrent flow of fluid with the granular solids through the restriction zone thereby permitting a variation in the flow rate of granular solids therethrough. The granular solids have a tendency to flow at a higher rate through the conveyance zone under the influence of a cocurrently depressuring conveyance fluid than the normal gravity flow rate through a vertical restriction zone. Thus by varying the pressure drop per unit length $$\left(\frac{dp}{dl}\right)$$

existing in the restriction zone, the granular solid flow rate therethrough may be made to exceed, be equal to, or be less than the maximum possible flow rate through the conveyance zone.

The present invention also contemplates the combination of the conveyance method and apparatus herein disclosed with industrial processes of various types wherein granular solids are passed through contacting vessels into which gaseous or liquid fluids are to be contacted. Thus the conveyance method of the present invention may be employed in the continuous contacting processes of the petroleum industry including thermal, catalytic, and adsorptive operations with granular solids. These include the separation of gaseous mixtures in contact with granular adsorbents such as charcoal, silica gel, aluminum oxide, and the like, the separation of liquid mixtures with solid granular adsorbents including clay treating of hydrocarbon fractions in the vapor or liquid phase, the thermal cracking or coking or reforming of hydrocarbon fluids in contact with superheated granular solids, and the catalytic cracking, reforming, desulfurization, aromatization, and the like, of hydrocarbon fractions in contact with heated granular solid catalysts. Furthermore, it is contemplated that the circulation of granular solids according to the present invention may be from the bottom of one vessel into the top of another vessel such as from a reactor to a regenerator or from an absorber to a stripper. This solids conveyance method may also be employed to raise granular solids removed from the bottom of a contacting column to the top of the same structure such as in the recent small scale catalytic cracking processes wherein reactors and regenerators are employed within the same structure or column shell.

The present invention is applicable to the conveyance of granular solids in any process or operation in which granular solids are to be intermittently or continuously conveyed and it is not intended by the foregoing discussion to restrict the method of the present invention to petroleum refinery operations alone.

The process and apparatus of the present invention may be more readily understood by reference to the accompanying drawings in which:

Figure 1 shows an elevation view in cross section of a contacting vessel or vessels through which granular solids are conveyed in controllable quantities according to the principle of the process and apparatus of this invention, and Figure 2 shows a modification of the construction of part of the conveyance zone of the present invention.

Referring now more particularly to Figure 1, the apparatus of the present invention is provided with contacting vessel 10, contacting vessel 12 which may be a continuation of vessel 10 or a separate vessel, solids feeders 14 and 14a, induction zones 16 and 16a, inlet zones 18 and 18a, conveyance zone 20, separator zone 22, restriction zone 24, and hopper zone 26. The granular solids accumulating in the bottom of contacting vessel 12 are removed therefrom and conveyed through the conveyance apparatus of the present invention and returned to the top of contact vessel 10. An intermittent flow of granular solids may be employed by drawing granular solids from contacting vessel 12 into induction zone or chamber 16, pressuring induction zone 16 with conveyance fluid, and depressuring the fluid and the solids concurrently through the conveyance conduit into separator chamber or zone 22. The next step is depressuring induction zone 16, refilling it from contacting vessel 12, and repeating the conveyance step. A continuous flow of granular solids between vessels 12 and 10 may be attained as shown in the drawing by employing two solids feeders 14 and 14a, two induction zones 16 and 16a, and two inlet zones 18 and 18a each feeding into conveyance conduit 20. The granular solids are alternately conveyed from contact vessel 12 through transfer lines 28 and 28a through solids feeders 14 and 14a into the respective induction zones. Solids feeders 14 and 14a may comprise automatic valves operating on a time sequence with automatic valves for controlling the introduction of conveyance fluid into the induction zones or they may comprise a star feeder type of device in which the granular solids are passed from a lower pressure in contact with vessel 12 into a higher pressure in induction zone 16 without a substantial reverse flow of conveyance fluid into contacting vessel 12. In such a case a single feeder, a single induction zone, and a single inlet zone may be used for continuous conveyance or if an intermittent flow of solids in the contacting vessel or vessels is tolerable, a single induction chamber may be used with discontinuous conveyance.

The granular solids, thus pressured, form accumulation 30 in induction zone 16. Conveyance fluid is introduced under pressure via line 32 controlled by valve 34 into induction zone 16 above solids accumulation 30. When two induction zones are employed lift gas is also introduced via line 32a controlled by valve 34a into induction zone 16a filled and depressured in alternation with the operating steps of induction zone 16.

The bottom of induction zone 16 may be provided, if desired, with sloping baffle or funnel 36 by means of which the granular solids and the conveyance fluid are directed into inlet zone 18. It has been found that by employing such a baffle as 36 and the reverse bend inlet zones 18, a 6- to 8-fold increase in the flow rate of granular solids through the conveyance zone may be attained. Thus the granular solids flow by gravity and a minor influence of the conveyance fluid from accumulation 30 into inlet zones 18. In the latter zones they are redirected to the direction of flow in the conveyance zone 20. The flow of granular solids through inlet zones 18 and conveyance zone 20 is predominantly effected by the depressuring of conveyance fluid as above described. The solids move in substantially compact form through the zones mentioned and through outlet zone 38 into separator zone 22. Outlet zone 38 is provided to redirect the granular solids from the direction of flow in conveyance zone 20 into separator zone 22. In another modification, not shown, conveyance zone 20 may curve somewhat to discharge the conveyed granular solids directly in an upward direction into separator zone 22. On the drawing, this may be done by displacing separator zone 22 upwardly and to the right so that conveyance zone 20 may open directly from below into zone 22.

The granular solids thus discharging into separator zone 22 are at least partially separated from the concurrently flowing conveyance fluid forming accumulation 40 of granular solids. The granular solids pass from accumulation 40 through restriction zone 24 and discharge directly into hopper zone 26 of contact vessel 10 in which a further disengaging or separating space is provided. The granular solids flow rate control is effected by varying in any one of several ways the concurrent flow rate of a fluid through restriction zone 24. Further control is attainable, although greater precision in control of fluid flow is required, by maintaining a countercurrent flow of fluid through restriction zone 24. This may be done by removal of conveyance fluid via line 42 and pumping it into zone 26 via line 48 or by regulation of back pressure regulator 50 and valve 44 so that a higher pressure exists in hopper 26 than separator zone 22 and varying the solids flow rate by variation in valve 54 in by-pass line 52 or valves 44 or 50 appropriately.

In one modification of solids flow rate control zone operation the concurrently flowing granular solids and conveyance fluid discharge as described into separator zone 22. A controlled portion of the conveyance fluid thus entering is removed therefrom via line 42 at a rate controlled by valve 44 in accordance with recording flow controller 46. Thus the remaining quantity of conveyance fluid passes concurrently through accumulation 40 and subsequently through restriction zone 24 and increases the flow rate of granular solids above the rate at which free gravity flow would convey them therethrough. By removing substantially all of the conveyance fluid via line 42 as described, the granular solids flow rate of the conveyance system is restricted to the flow rate at which the granular solids will pass by gravity through restriction zone 24. By throttling valve 44 and thereby reducing the quantity of conveyance fluid removed via line 42 and increasing the quantity of conveyance fluid flow through restriction zone 24 the flow rate of granular solids through the latter zone may be markedly increased. In any event the conveyance zone conveys the quantity of granular solids which is equal to the rate at which granular solids are discharged through restriction zone 24 since accumulation 40 maintained by restriction zone 24 effectively applies a thrust force referred to above against the solids discharging from the conveyance conduit thereby keeping the solids therein in compact form. That part of the conveyance fluid passing concurrently with the solids through restriction zone 24 is removed from the fluid space in hopper zone 26 via line 48 in accordance with back pressure regulator 50 which maintains the operating pressure on contact vessel 10.

In another modification the granular solids are elutriated in hopper zone 26 and the fine particles which are undesirable in the contact bed of solids in vessel 10 are removed with the remainder or second portion of the conveyance fluid.

In another modification of the present invention the solids flow rate control zone is operated by by-passing via line 52 a controllable portion of conveyance fluid from separator zone 22 directly into hopper zone 26 without passing cocurrently with the solids through restriction zone 24. By-passing line 52 is provided with control valve 54 operating in accordance with differential pressure controller 56. A predetermined cocurrent pressure drop is maintained across restriction zone 24 and maintained by the throttling effect of control valve 54. Thus a first portion of the conveyance fluid passes directly via line 52 around restriction zone 24 into hopper zone 26. The second, or remaining portion as before passes cocurrently with the granular solids through restriction zone 24. Similarly, by increasing the quantity of gas by-passed through line 52 and simultaneously decreasing the differential pressure existing across restriction zone 24 a decreased quantity of cocurrent conveyance fluid flow is maintained thereby reducing the granular solids flow rate. The first and second portions of conveyance fluid in the second modification collect in hopper zone 26 and are removed therefrom via line 48 as above described. The granular solids accumulating in contact vessel 10 pass downwardly therethrough to whatever contact is employed in the process.

The design of the conveyance zone with respect to its cross sectional area depends largely upon the type of conveyance fluid being employed as well as on the quantity of granular solids to be conveyed in a given period. Of course with larger flow rates larger cross sectional areas are required. However, when gaseous conveyance fluids are employed a substantial increase in the volume of the conveyance fluid occurs as it depressures through the conveyance zone. In a conveyance zone having a constant cross sectional area, the conveyance fluid velocity increases with proximity to the discharge opening. With this increased conveyance fluid velocity the conveyance force ratio increases unnecessarily since a conveyance force slightly above 1.0 is usually required. In a cylindrical conveyance zone the conveyance force ratio may be as high as 5 to 10 times the minimum value, whereas, solids would be equally well conveyed if it were maintained at a value, for example, of 1.3 throughout the length of the conveyance conduit.

To maintain the conveyance force ratio at more nearly the minimum value a tapered conveyance zone such as that shown in Figure 1, or a segmented conveyance zone shown in Figure 2 consisting of a series of serially connected coaxial cylindrical sections arranged in order of increased diameter in the direction of flow may be used when gaseous conveyance fluids are employed. Thus as the conveyance fluid depressures and the lineal velocities increase, the increase in cross sectional area counteracts the velocity increase and maintains the conveyance force ratio substantially constant. The tapered conveyance zone 20 shown in Figure 1 may be designed to exactly compensate for the velocity increase and maintain an absolutely constant conveyance force ratio. In Figure 2 by the use of a segmented conveyance zone the cross sectional areas and the length of each section may be designed so that the minimum conveyance force ratio exists at the inlet to each section and only a moderately increased value exists at the outlet of each section. Thus a conveyance force ratio existing at the inlet opening of first section 20a may be 1.2 and rise to 3.5, for example, at the top of section 20a. Due to the increase in cross sectional area provided by swage or coupling 21, the conveyance force ratio existing at the bottom of second section 20b may be again reduced to 1.2. A similar effect is provided at the outlet of section 20b by the use of coupling 23. The conveyance conduit of Figure 2 may be used to replace that of Figure 1 if desired. Furthermore the cross sections may be cylindrical, elliptical, square, triangular, or the like. The cylindrical cross section is preferred because of its capability to withstand maximum pressures with minimum wall thickness.

When liquid conveyance fluids are employed, there is no significant volume and velocity change and conduits of uniform cross sectional area are preferred.

The principles of the present invention were applied to the conveyance of synthetic bead catalysts having a bulk density of 39.9 pounds per cubic foot and an average particle diameter of 0.146 inch. A conveyance zone was employed which had two cylindrical sections, the lower being 3-inch nominal pipe size and the upper 4-inch nominal pipe size. The separator zone was a section of nominally 10-inch pipe opening into the restriction zone. In the tests, restriction zones having 3-inch and 4-inch nominal pipe size diameters each 4 inches in length were employed and concurrent flow of conveyance gas with solids was employed. The following data were obtained:

Table

| Restriction Zone, Nominal Pipe Size | Pressure Drop, Inches of Water | Flow Rate, Pounds per Hour |
| --- | --- | --- |
| 3-inch | 5.3 | 28,900 |
| 3-inch | 6.5 | 35,600 |
| 4-inch | 1.8 | 40,400 |
| 4-inch | 3.5 | 45,800 |

In comparing these granular solids flow rates it will be seen that a marked increase over the free gravity flow rate of 15,500 pounds per hour with the 3-inch restriction zone and 31,100 pounds per hour for the 4-inch restriction zone were obtained, these rates corresponding to a zero inches of water pressure drop across the restriction zone.

It is to be understood that the foregoing example is not intended to limit the present invention to the handling of bead catalysts alone since similar results may be obtained with any granular solids. As before stated in connection with the conveyance conduit the quantity of gas necessary to generate the pressure drops across the restriction zone for controlling the solids flow rate vary in direct proportion to the permeability of the compact granular solids. In other words, greater flow rates are required with masses of larger size granules.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:
1. A process which comprises passing granular solids through a contacting zone, contacting said solids therein with a contacting fluid, removing granular solids from said contacting zone, passing the thus removed solids into an induction zone forming an accumulation of compact granular solids therein, introducing a conveyance fluid under pressure into said induction zone, flowing said conveyance fluid cocurrently with said granular solids from said induction zone through a conveyance zone into a separator zone, maintaining an accumulation of substantially compact granular solids therein against the conveyance zone outlet thereby maintaining said solids therein at substantially the bulk density of the solids when at rest, flowing granular solids from said last-named accumulation through a restriction zone into a hopper zone, passing solids therefrom into said contacting zone, controlling the recirculation rate of granular solids in the process by flowing a fluid simultaneously through said restricting zone with said granular solids, and controlling the flow rate of said fluid.

2. A process according to claim 1 wherein said fluid passing through said restriction zone comprises a portion of said conveyance fluid.

3. A process according to claim 1 wherein said hopper zone exists as a part of said contacting zone.

4. A process according to claim 1 wherein a substantially constant conveyance force ratio is maintained within said conveyance zone by maintaining a substantially constant conveyance fluid velocity therein.

5. A process according to claim 1 in combination with the step of pressuring granular solids from said contacting zone into said induction zone.

6. A process according to claim 1 wherein the quantity of fluid passing through said restriction zone is controlled by by-passing a portion of said conveyance fluid from said separator zone directly to said hopper zone to maintain a predetermined differential pressure across said restriction zone and allowing the remainder to pass concurrently with said solids therethrough.

7. A process according to claim 1 wherein said quantity of fluid flow through said restriction zone is controlled by removing a controllable quantity from said separator zone and allowing the remaining portion to pass cocurrently through said restriction zone.

8. A process which comprises passing granular solids from a hopper zone through a contacting zone, contacting said solids therein with a contacting fluid, removing granular solids from said contacting zone, passing the thus removed solids into an induction zone forming an accumulation of compact granular solids therein, introducing a conveyance fluid under pressure into said induction zone thereby flowing said conveyance fluid cocurrently with said granular solids from said induction zone through a conveyance zone, discharging granular solids from said conveyance zone into a separator zone forming an accumulation of substantially compact granular solids therein against the outlet of the conveyance zone thereby maintaining said solids therein substantially at their static bulk density, flowing granular solids from said last-named accumulation through a restriction zone into said hopper zone, and controlling the recirculation rate of granular solids through the system by varying the differential pressure of a fluid flowing through said restriction zone with said solids.

9. A process which comprises passing granular solids through a contacting zone, contacting said solids therein with a contacting fluid, removing granular solids from said contacting zone, passing the thus removed solids into an induction zone forming an accumulation of compact granular solids therein, introducing a conveyance fluid under pressure into said induction zone thereby flowing said conveyance fluid cocurrently with said granular solids from said induction zone through a conveyance zone, maintaining an accumulation of solids discharged from said conveyance zone in substantially compact form, adjacent the outlet opening thereof within a separator zone to apply a force against solids discharging from said conveyance zone to maintain said solids during conveyance substantially at their bulk density therein, flowing granular solids from said last-named accumulation through a restriction zone into a hopper zone, and controlling the flow rate of granular solids recirculating in the process by passing a controllable quantity of fluid through said restriction zone countercurrent to the granular solids flowing therethrough.

10. A process according to claim 9 wherein said countercurrent flow of fluid through said restriction zone is maintained by the steps of removing a controllable quantity of conveyance fluid from said separator zone and repressuring said fluid into said hopper zone to depressure through said restriction zone countercurrently to the solids passing therethrough.

11. A process according to claim 9 wherein said countercurrent flow of fluid through said restriction zone is established by controlling the pressure in said hopper zone at a value in excess of that maintained in said separator zone.

12. A method for the conveyance of granular solids which comprises flowing a conveyance fluid cocurrently with substantially compact granular solids through a conveyance zone, maintaining an accumulation of discharged solids immediately adjacent the outlet of said conveyance zone thereby applying a force against the solids discharging therefrom to maintain said solids therein substantially at their static bulk density, passing discharged granular solids from said accumulation through a restriction zone, and controlling the flow rate of granular solids through said conveyance zone and from said accumulation by varying the pressure drop of a fluid flowing through said restriction zone with said solids.

13. A process for the conveyance of granular solids which comprises establishing a conveyance zone communicating with a separator zone which in turn communicates with a restriction zone, flowing a conveyance fluid cocurrently with and at a rate sufficient to convey said solids through said conveyance zone, maintaining an accumulation of solids discharged therefrom in said separator zone against the outlet opening of said conveyance zone to apply a force against solids discharging therefrom to maintain said solids therein at a bulk density substantially equal to the static bulk density of said solids when at rest, and controlling the rate of granular solids conveyance through said conveyance zone into said separator zone by varying the pressure drop of a fluid flowing through said restriction zone.

14. A process according to claim 13 wherein said pressure drop across said restriction zone is generated by passing a fluid cocurrently with granular solids passing therethrough.

15. A process according to claim 13 wherein said pressure drop across said restriction zone is generated by passing a fluid countercurrently to granular solids passing therethrough.

16. A process for the conveyance of granular solids which comprises establishing a conveyance zone communicating between an induction zone and a separator zone, introducing granular solids into said induction zone, introducing a conveyance fluid into said induction zone under pressure thereby flowing said conveyance fluid through said conveyance zone cocurrently with a substantially compact continuous moving mass of granular solids, discharging granular solids and conveyance fluid into said separator zone, maintaining an accumulation of compact granular solids therein immediately adjacent the outlet opening of said conveyance zone to restrict the discharge of solids therefrom and maintain solids therein substantially at their static bulk density, passing granular solids from said accumulation through a restriction zone, controlling the granular solids flow rate through said conveyance zone by flowing at least a portion of said conveyance fluid cocurrently with said granular solids through said restriction zone, and controlling the rate of conveyance fluid flow through said restriction zone.

17. A process according to claim 16 wherein a controllable first portion of said conveyance fluid is removed from said separator zone and the remaining portion of said conveyance fluid is cocurrently passed with granular solids through said restriction zone.

18. A process for the conveyance of granular solids which comprises introducing granular solids into a conveyance zone, introducing a conveyance fluid into said conveyance zone, passing said conveyance fluid cocurrently through a compact mass of granular solids maintained throughout said conveyance zone at a sufficient rate to convey said solids therethrough, discharging granular solids and said conveyance fluid into a separator zone, maintaining an accumulation of granular solids therein against the outlet of said conveyance zone to maintain the solids therein substantially at their static bulk density, flowing said granular solids from said accumulation through a restriction zone into a hopper zone, passing a fluid simultaneously through said restriction zone with said solids to establish and maintain a pressure differential between the extremities of said restriction zone, and controlling the rate of solids flow through said conveyance zone by controlling the differential pressure existing between said separator zone and said hopper zone to vary the rate of solids flow through said conveyance zone, said separator zone and said restriction zone.

19. A process according to claim 18 in combination with the step of removing a controllable first portion of said conveyance fluid from said separator zone and allowing the remaining portion to pass cocurrently with said solids through said restriction zone into said hopper zone to generate said differential pressure.

20. A process according to claim 19 wherein said first portion is removed from said separator zone and introduced directly into said hopper zone.

21. A process according to claim 20 wherein a portion of said conveyance fluid is removed from said separator zone and pressured into said hopper zone to depressure countercurrently to solids passing through said restriction zone.

22. A process according to claim 18 wherein a flow of fluid is established countercurrent to the granular solids flowing through said restriction zone by the step of maintaining the pressure of said hopper zone at a predetermined value above that of said separator zone.

23. An apparatus for the conveyance of granular solids which comprises an induction chamber, separate inlets for granular solids and conveyance fluid thereinto, an outlet from said induction chamber opening into a conveyance conduit, said conveyance conduit opening into a separator chamber, a restricted outlet for said separator chamber adapted to maintain an accumulation of unfluidized compact solids therein to restrict granular solids discharge thereinto from said conveyance conduit and maintain solids therein in unfluidized compact form, outlet means for conveyance fluid from said separator chamber, and means for passing a variable flow of fluid through said restricted outlet in the presence of solids passing therethrough.

24. An apparatus according to claim 23 wherein said outlet opening from said induction chamber into said conveyance conduit comprises an arcuate conduit communicating the bottom of said induction chamber with the inlet opening of said conveyance conduit.

25. An apparatus according to claim 23 wherein said conveyance conduit is provided near its outlet end with an arcuate portion opening downwardly into the upper portion of said separator chamber.

26. An apparatus according to claim 23 in combination with another induction chamber, separate inlets for granular solids and conveyance fluid opening into said second induction chamber, and a second outlet from said second induction chamber opening into said conveyance conduit at the same point as does the outlet from the other induction chamber.

27. An apparatus according to claim 23 in combination with solids feeder means for introducing granular solids from a relatively low pressure into said induction chamber through the solids inlet thereto at a relatively high pressure.

28. An apparatus according to claim 23 in combination with a fluid-solids contacting column, means for passing solids from said hopper chamber into said column, means for passing solids from said column into said induction chamber, and means for passing a fluid through said column to contact the granular solids passing therethrough.

29. An apparatus for the conveyance of granular solids which comprises a conveyance conduit, a separator chamber in solids receiving relation to said conveyance conduit, a restricted outlet opening for granular solids from said separator chamber adapted to maintain a dense mass of solids therein to restrict solids discharge from said conveyance conduit to maintain solids therein substantially at their static bulk density, means for depressuring a conveyance fluid cocurrently with solids through said conveyance conduit into said separator chamber, means for passing a portion of said conveyance fluid through said restriction cocurrent with solids to generate a differential pressure, and means for controlling said differential pressure existing across said restriction.

30. An apparatus according to claim 29 in combination with a by-pass conduit communicating said separator chamber with a hopper chamber in receiving relation for solids from said restriction, means for throttling a fluid flow through said by-pass conduit, and means for elutriating granular solids introduced into said hopper chamber in combination with means for removing fluids therefrom.

31. An apparatus according to claim 30 in combination with a differential pressure controller means adapted to throttle the flow through said by-pass conduit to maintain a predetermined pressure differential between said separator chamber and said hopper chamber.

32. An apparatus for the conveyance of granular solids which comprises a conveyance conduit, a separator chamber in solids receiving relation to said conveyance conduit, a restricted outlet opening for granular solids from said separator chamber into a hopper chamber, means for depressuring a conveyance fluid cocurrently with solids through said conveyance conduit into said separator chamber, means for passing a variable portion of fluid through said restricted outlet countercurrent to solids flowing therethrough to generate a differential pressure, and means for controlling said differential pressure existing across said restriction to thereby control the solids flow rate through said conveyance conduit and to maintain a mass of discharged solids in said separator chamber to restrict solids discharge thereinto from said conveyance conduit to maintain solids therein at substantially their static bulk density.

33. An apparatus according to claim 32 in combination with means for withdrawing depressured conveyance fluid from said separator chamber, pressuring means for increasing the pressure thereof, and a conduit opening from said pressuring means into said hopper chamber for the repressured fluid to depressure through said restricted outlet countercurrent to solids flowing therethrough.

34. An apparatus according to claim 32 in combination with a hopper chamber in solids receiving relation to said restricted outlet, an outlet conduit for fluids from said hopper, and means in said outlet for maintaining the pressure in said hopper at a variable value above that maintained in said separator chamber to depressure a fluid through said restricted outlet countercurrent to solids flowing therethrough.

References Cited in the file of this patent

UNITED STATES PATENTS

| | | |
|---|---|---|
| 788,741 | Trump | May 2, 1905 |
| 1,901,932 | Schaub | Mar. 21, 1933 |
| 1,943,376 | Dilling | Jan. 16, 1934 |
| 2,304,827 | Jewell | Dec. 15, 1942 |
| 2,414,373 | Gerhold | Jan. 14, 1947 |
| 2,493,911 | Brandt | Jan. 10, 1950 |
| 2,509,983 | Morrow | May 30, 1950 |
| 2,561,148 | Snow | July 17, 1951 |
| 2,561,771 | Ardern | July 24, 1951 |

FOREIGN PATENTS

| | | |
|---|---|---|
| 180,397 | Great Britain | May 11, 1922 |
| 268,667 | Great Britain | Apr. 7, 1927 |